United States Patent
McIlrath et al.

(10) Patent No.: US 10,363,789 B2
(45) Date of Patent: Jul. 30, 2019

(54) TOP MOUNT ASSEMBLY WITH BUSHING HAVING INTEGRAL ANTI-VIBRATION FEATURE

(71) Applicant: The Pullman Company, Milan, OH (US)

(72) Inventors: Tim McIlrath, Milan, OH (US); Frank McCarthy, Milan, OH (US); Scott Braddock, Milan, OH (US)

(73) Assignee: The Pullman Company, Milan, OH (US)

( * ) Notice: Subject to any disclaimer, the term of this patent is extended or adjusted under 35 U.S.C. 154(b) by 71 days.

(21) Appl. No.: 15/615,174

(22) Filed: Jun. 6, 2017

(65) Prior Publication Data
US 2018/0009282 A1    Jan. 11, 2018

Related U.S. Application Data

(60) Provisional application No. 62/359,482, filed on Jul. 7, 2016.

(51) Int. Cl.
*B60G 15/06* (2006.01)
*F16F 9/00* (2006.01)

(52) U.S. Cl.
CPC .......... *B60G 15/067* (2013.01); *F16F 9/006* (2013.01); *B60G 15/068* (2013.01); *B60G 2204/10* (2013.01)

(58) Field of Classification Search
CPC .............. B60G 15/067; B60G 15/068; B60G 2204/10; F16F 9/006
See application file for complete search history.

(56) References Cited

U.S. PATENT DOCUMENTS

| 4,493,490 A | 1/1985 | Ohma |
| 4,711,463 A | 12/1987 | Knable et al. |

(Continued)

FOREIGN PATENT DOCUMENTS

| CN | 202518055 U | 11/2012 |
| CN | 105697629 A | 6/2016 |

(Continued)

OTHER PUBLICATIONS

M. Roemer, DE 1990 7672 C1, English machine translation, ip.com (Year: 2000).*

*Primary Examiner* — Karen Beck
(74) *Attorney, Agent, or Firm* — Harness, Dickey & Pierce, P.L.C.

(57) ABSTRACT

A suspension mount assembly for coupling a first component and a second component of a vehicle comprises a housing including a bore and a first shoulder. The housing is adapted to be coupled to the first component of the vehicle. An elastomeric bushing includes a bore adapted to receive the second component of a vehicle. The elastomeric bushing includes a first portion, a spaced apart ring portion, and a web portion interconnecting the ring portion of the first portion. The ring portion, the web portion and the first portion are integrally formed with one another. A cap includes a peripheral portion having a second shoulder. The elastomeric bushing is positioned within the housing bore with the ring portion being engaged with the first shoulder. The first shoulder cooperates with the second shoulder to trap the ring portion between the housing and the cap and provide a seal and vibration isolator therebetween.

14 Claims, 5 Drawing Sheets

(56) References Cited

U.S. PATENT DOCUMENTS

| | | | |
|---|---|---|---|
| 5,040,775 A * | 8/1991 | Miyakawa | B60G 13/003 267/140.13 |
| 5,180,144 A | 1/1993 | Hellyer et al. | |
| 5,362,035 A | 11/1994 | Carter | |
| 5,487,535 A * | 1/1996 | Carter | B60G 15/062 267/220 |
| 5,690,319 A | 11/1997 | Robinson et al. | |
| 6,843,472 B2 | 1/2005 | Henry, III et al. | |
| 7,584,944 B2 | 9/2009 | Goudie | |
| 7,922,156 B2 | 4/2011 | Goudie | |
| 7,938,418 B1 * | 5/2011 | Coombs | B60G 15/068 267/220 |
| 9,701,170 B2 | 7/2017 | DeBruler et al. | |
| 2002/0135111 A1 * | 9/2002 | Bishop | B60G 13/003 267/64.23 |
| 2005/0008276 A1 * | 1/2005 | Beghini | B21D 53/10 384/609 |
| 2005/0127587 A1 | 6/2005 | Nagai | |
| 2011/0140323 A1 | 6/2011 | Kwon | |
| 2014/0070512 A1 * | 3/2014 | Wilson | B60G 11/22 280/124.155 |
| 2015/0273968 A1 * | 10/2015 | DeBruler | F16F 13/002 267/64.24 |
| 2017/0282664 A1 * | 10/2017 | Chambers | B60G 15/067 |
| 2017/0291464 A1 * | 10/2017 | Isaac | B60G 13/003 |

FOREIGN PATENT DOCUMENTS

| | | |
|---|---|---|
| DE | 19826480 A1 | 1/1999 |
| DE | 19907672 C1 | 7/2000 |
| DE | 102012214954 B3 | 1/2014 |
| JP | 2006168663 A | 6/2006 |

\* cited by examiner

TOP MOUNT ASSEMBLY WITH BUSHING HAVING INTEGRAL ANTI-VIBRATION FEATURE

CROSS-REFERENCE TO RELATED APPLICATIONS

This application claims the benefit of U.S. Provisional Application No. 62/359,482, filed on Jul. 7, 2016. The entire disclosure of the above application is incorporated herein by reference.

FIELD

The present disclosure relates to top mount assemblies used with shocks/struts employed on suspension systems of motor vehicles, and more particularly to a top mount assembly having a bushing constructed to dampen vibration occurring between a cap and a housing of the top mount assembly.

BACKGROUND

The statements in this section merely provide background information related to the present disclosure and may not constitute prior art.

Some present day shock/strut assemblies use a top mount assembly having a cap and a housing to which the cap is secured. An elastomeric bushing is positioned within the housing and one end thereof is partially covered by the cap. Noise, vibration, and harshness issues may exist when vibrations are transferred between the cap and the housing. A need to provide a seal between the cap and housing also exists.

SUMMARY

A suspension mount for use with a shock/strut assembly is disclosed. The suspension mount assembly incorporates an elastomeric bushing having an integrally formed O-ring about its peripheral edge. The bushing with its integrally formed O-ring allows expedited assembly and provides a low cost suspension mount. The bushing with its integrally formed O-ring also reduces or eliminates the possibility of improper installation.

A suspension mount for coupling a first component and a second component of a vehicles comprises a housing including a bore and a first shoulder. The housing is adapted to be coupled to the first component of the vehicle. An elastomeric bushing includes a bore adapted to receive the second component of a vehicle. The elastomeric bushing includes a first portion, a spaced apart ring portion, and a web portion interconnecting the ring portion of the first portion. The ring portion and the web portion of the first portion are integrally formed with one another. A cap includes a peripheral portion having a second shoulder. The elastomeric bushing is positioned within the housing with the ring portion being engaged with the first shoulder. The first shoulder cooperates with the second shoulder to trap the ring portion between the housing and the cap and provide a seal therebetween.

DRAWINGS

The drawings described herein are for illustration purposes only and are not intended to limit the scope of the present disclosure in any way.

Figure 1:
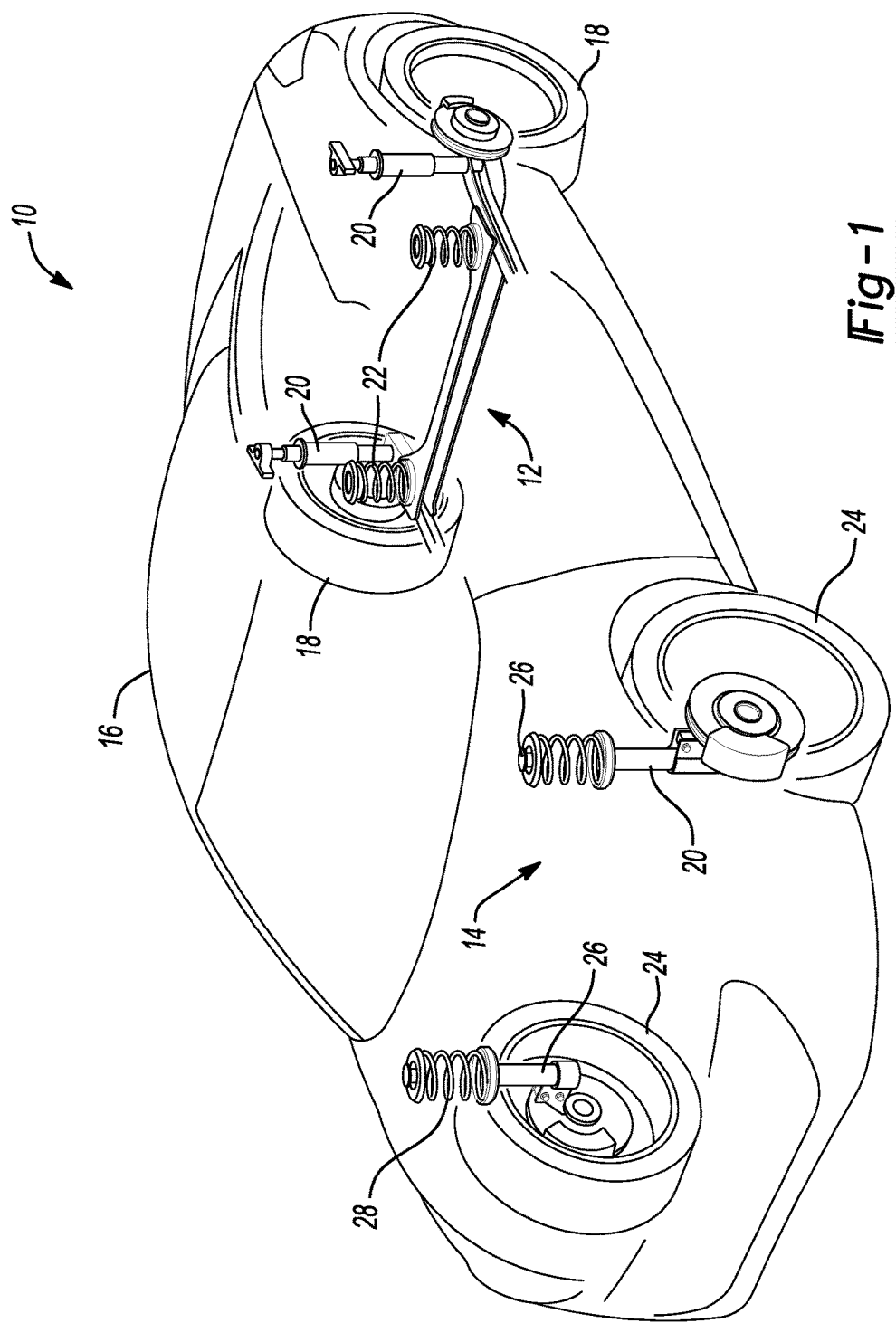
FIG. 1 is an illustration of an automobile using top mount assemblies in accordance with the present disclosure.
Figure 3:
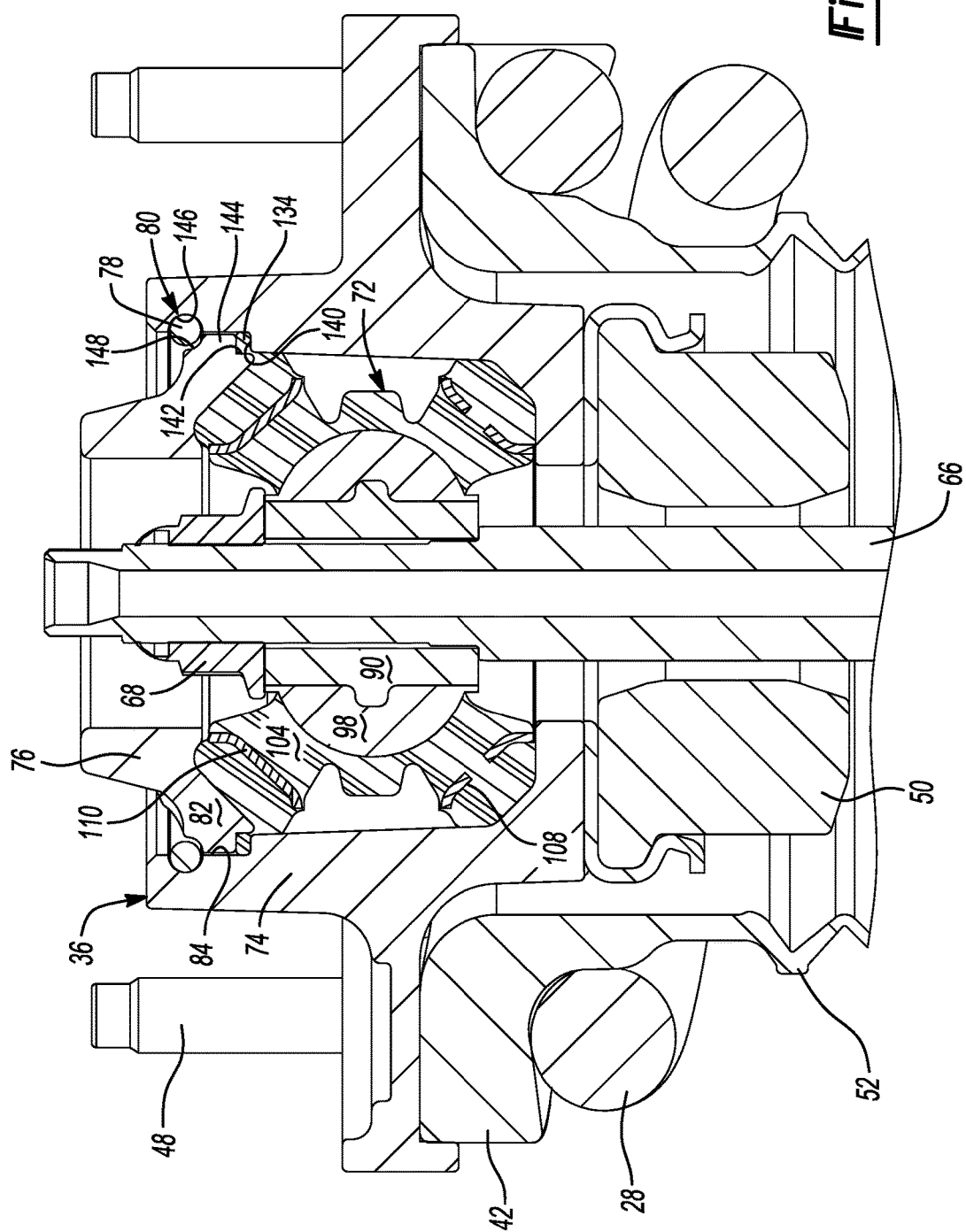
Figure 4:
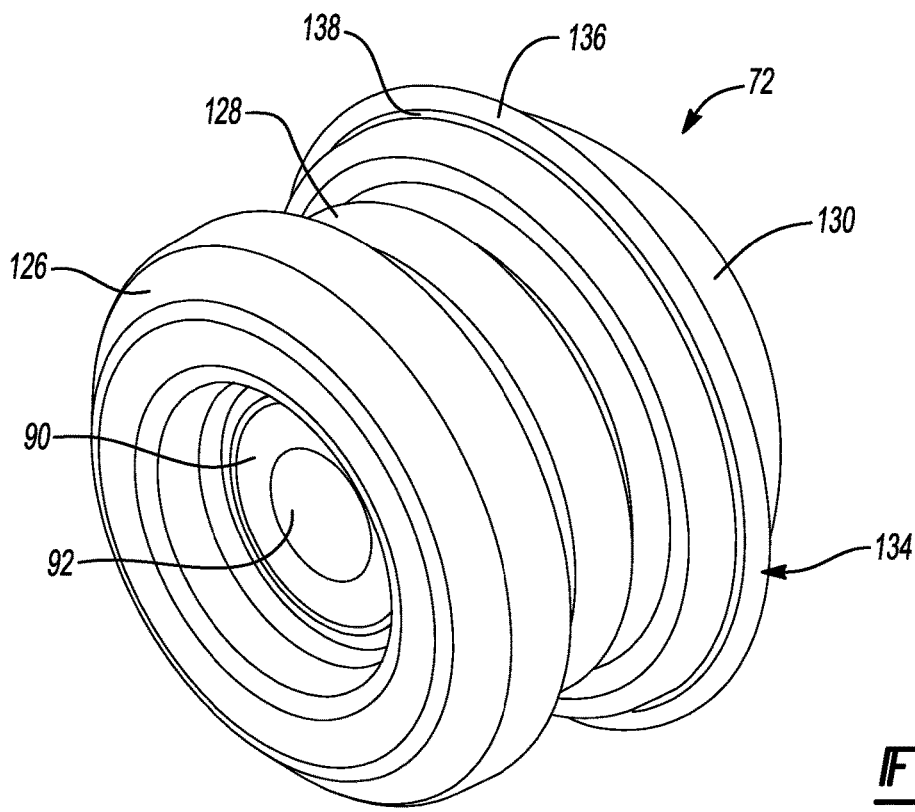
Figure 5:
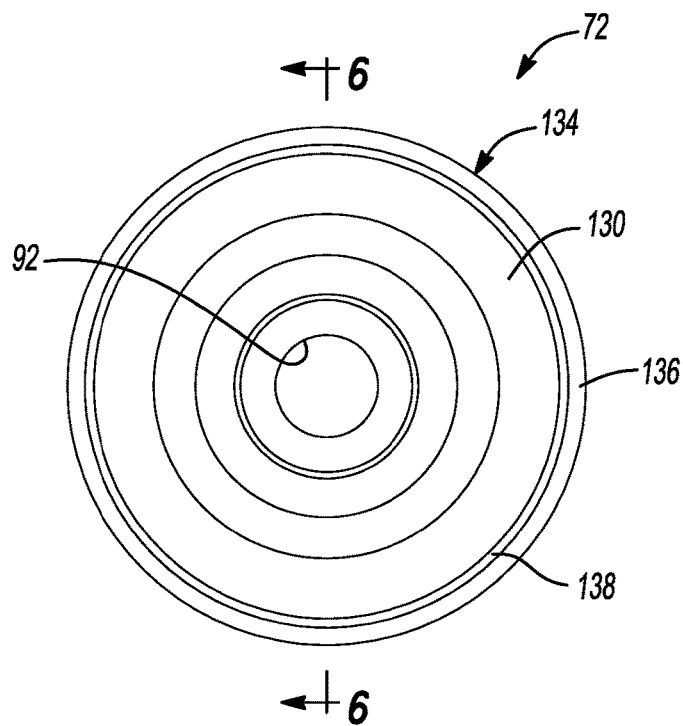
Figure 6:
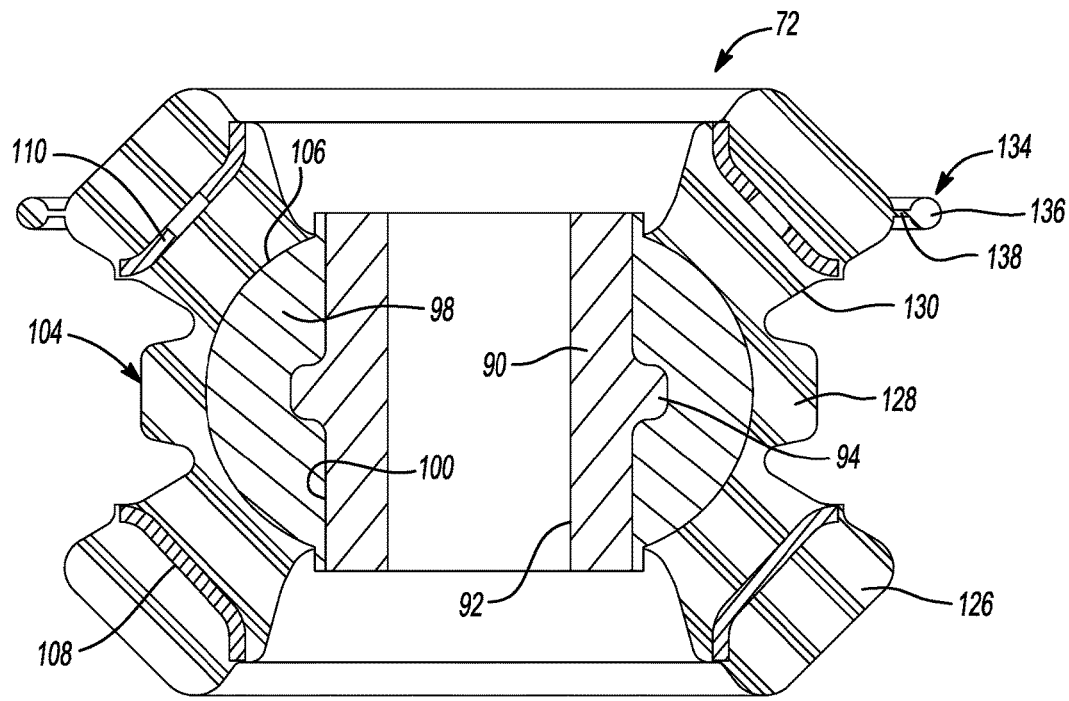

FIG. 3 is a cross-sectional view of a top mount assembly in accordance with one embodiment of the present disclosure, wherein the top mount assembly includes a bushing having an integrally formed O-ring along one peripheral edge which is adapted to engage between an edge portion of a cap and an interior surface of a housing, and wherein the cap, bushing and housing form the top mount assembly for a strut;

FIG. 4 is a perspective side view of the bushing of FIG. 1;

FIG. 5 is a top view of the bushing of FIG. 1;

FIG. 6 is a side cross-sectional view of the bushing of FIG. 1; and

Figure 7:
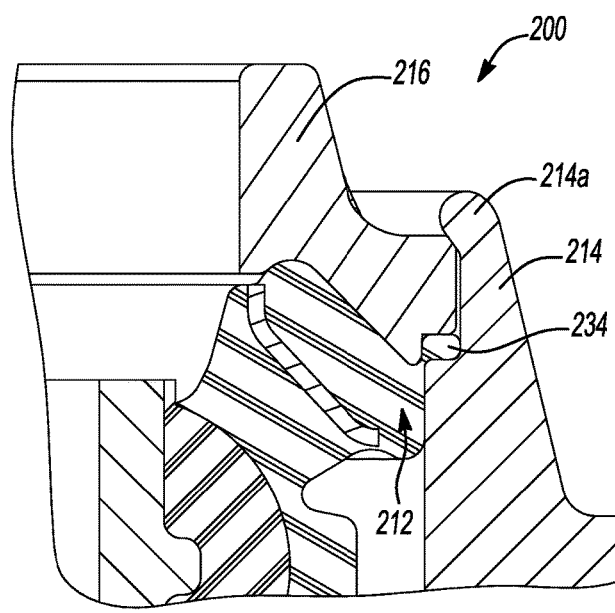

FIG. 7 shows another embodiment of the present disclosure in which a bushing having an integral O-ring portion is captured beneath a cap, and wherein the cap is held in place by a roll formed edge feature or other mechanical deformation of an edge portion of the housing which eliminates the need for a circlip.

DESCRIPTION

The following description is merely exemplary in nature and is not intended to limit the present disclosure, application, or uses. It should be understood that throughout the drawings, corresponding reference numerals indicate like or corresponding parts and features.

There is shown in FIG. 1 a vehicle incorporating a suspension system having the top mount assembly in accordance with the present disclosure and which is designated generally by the reference numeral 10. The top mount assembly may more generally be identified as a suspension mount. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly front suspension 14 includes a transversely extending front axle assembly (not shown) to operatively support the vehicle's front wheels 24. The front axle assembly is operatively connected to body 16 by means of a second pair of shock absorbers 26 and by a pair of shaped helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 26, it is within the scope of the present disclosure to have rear suspension 12 incorporate a pair of struts or shock absorbers 26 if desired.

Figure 2:
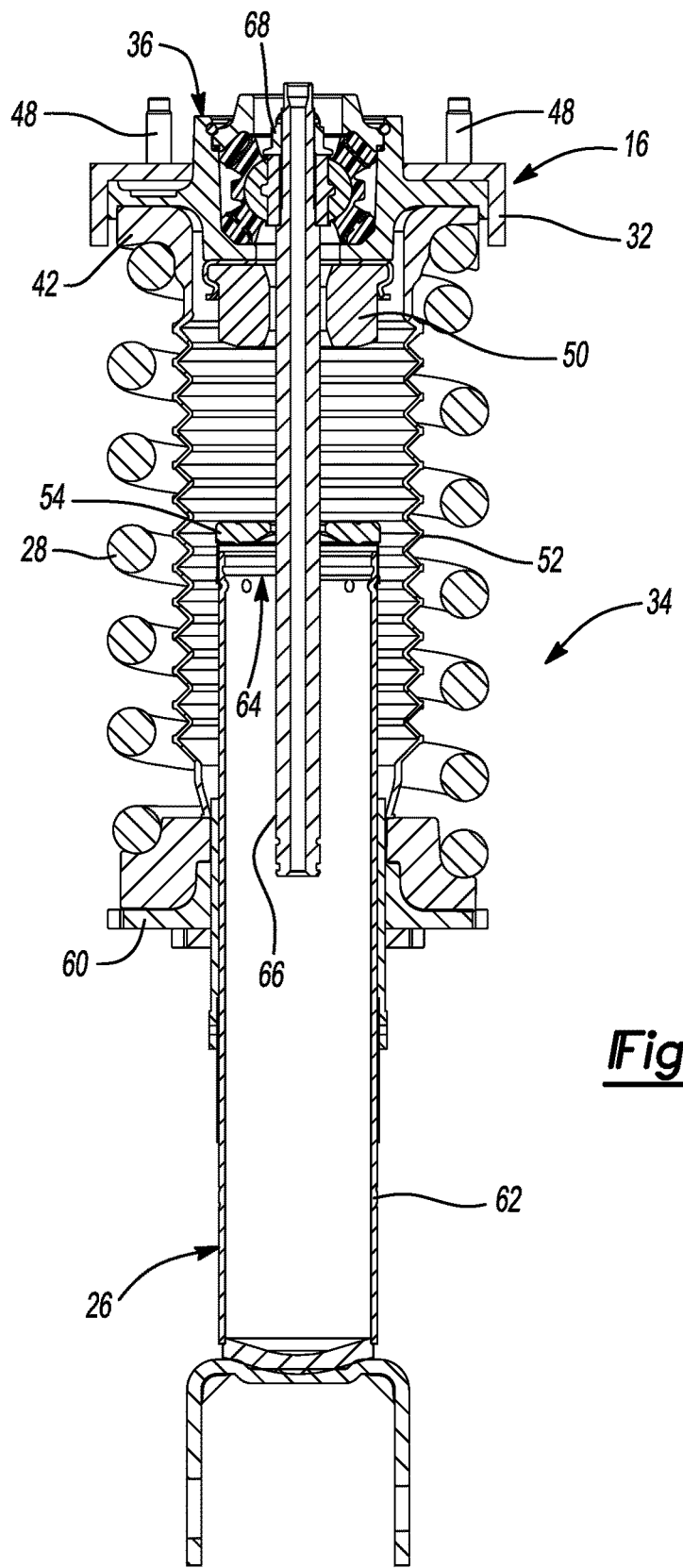
FIG. 2 is a side view of one of the front suspension units that incorporate the top mount assembly in accordance with the present disclosure.

Referring now to FIG. 2, a portion of the front wheel suspension for vehicle 10 is illustrated in greater detail. Body 16 defines a shock tower 32 comprising sheet metal of vehicle 10 within which is mounted a strut assembly 34 which comprises a telescoping device in the form of shock absorber 26, coil spring 28 and a top mount assembly 36.

Strut assembly 34 including shock absorber 26, coil spring 28 and top mount assembly 36 are attached to vehicle 10 using shock tower 32.

Strut assembly 34 further includes an upper spring seat 42 and a jounce bumper 50. Jounce bumper 50 is disposed between upper spring seat 42 and shock absorber 26. Jounce bumper 50 comprises an elastomeric material. A protective bellows 52 is integrally formed with upper spring seat 42. A bumper cap 54 is located on shock absorber 26 to interface with jounce bumper 50, if necessary.

A lower spring seat 60 is attached to shock absorber 26 and coil spring 28 is disposed between upper spring seat 42 and lower spring seat 60 to isolate body 16 from front suspension 14. Shock absorber 26 comprises an outer tube 62, a piston assembly 64 and a telescoping rod or piston rod 66. While shock absorber 26 is illustrated as a mono-tube design, it is within the scope of the present disclosure to utilize a dual-tube shock absorber for shock absorber 26. In this design, lower spring seat 60 would attach to the reserve tube of the dual tube shock absorber. Also, while shock absorber 26 is illustrated in FIG. 2, it is to be understood that shock absorber 20 may also include the features described herein for shock absorber 26. A retaining nut 68 is threadingly received on the end of piston rod 66 to secure piston rod 66 to top mount assembly 36.

Referring to FIGS. 3-6, there is shown a portion of a suspension mount or top mount assembly 36 for a strut, in accordance with one embodiment of the present disclosure. The top mount assembly 36 generally includes an elastomeric bushing 72 which is enclosed within a housing 74 and covered by a cap 76. The cap 76 and the housing 74 are typically made from cast aluminum. A circlip 78 is typically installed within a groove 80 which is cooperatively formed by a peripheral portion 82 of the cap 76 and an interior surface 84 of the housing 74. The circlip 78 retains the cap 76 on the housing 74.

The bushing 72 is shown in greater detail in FIG. 6. The bushing 72 includes an inner tube 90 including a bore 92 and a radially outwardly extending protrusion 94. Inner tube 90 may be constructed from grade 1045 cold formed steel. An inner body 98 is overmolded onto an outer surface 100 of inner tube 90. Inner body 98 may be constructed from a plastic material such as PA66 nylon filled with 50% glass fiber. An outer body 104 is overmolded onto an external surface 106 of inner body 98. Outer body 104 is preferably constructed from elastomeric material, possibly conforming to SAE J200, encapsulating a first rate plate 108 and a second rate plate 110. First rate plate 108 is positioned within a lower portion 126 of bushing 72. Second rate plate 110 is positioned within an upper portion 130 of bushing 72. A central portion 128 is positioned between lower portion 126 and upper portion 130. Bore 92 extends fully through the bushing for allowing piston rod 66 of shock absorber 26 to project therethrough. Outer body 104 is an integrally formed, single piece component made from a suitably high strength elastomer.

A principal feature of the outer body 104 is an integrally formed O-ring 134, which is formed about a peripheral edge of the upper portion 130. The O-ring 134 includes a main body portion 136 and a web portion 138 which projects radially outwardly from the upper portion 130. In this embodiment, the O-ring extends a full 360 degrees around the upper portion 130, although it need not necessarily extend a full 360 degrees. It is possible that the O-ring 134 may include a plurality of circumferentially spaced sections arranged around the upper portion 130, and these spaced apart sections could also have slightly different thicknesses.

The diameter of the main body portion 136 of the O-ring 134 may vary significantly, but is typically between about 2.00 mm-6.35 mm in diameter. At certain points around the circumference of the O-ring 134, the thickness of the web portion 138 may be increased so as to help retain the main body portion 136 even if the thinner profile web portion 138 should partially tear or rip from the upper portion 130 of the bushing 72. It is understood by one skilled in the art that certain points around the O-ring or web may be void of any bushing material.

With reference to FIGS. 2 and 3, assembly of the top mount assembly 36 may be achieved by first inserting the bushing 72 into the housing 74 to a predetermined position in which the main body portion 136 of the O-ring 134 engages and seats on a shoulder 140 of an interior wall of the housing 74, as best seen in FIG. 3. At this point, the O-ring will be slightly compressed against the shoulder 140. The cap 76 may then be placed on the housing 74 and pressed into place so that an inner shoulder 142 on a peripheral edge 144 of the cap presses against the O-ring 134. While holding the cap 76 in this position, the circlip 78 may be pressed into the groove 80. The groove 80 is cooperatively formed by an arcuate section 146 of the housing 74 and an arcuate section 148 of the cap 76. Once fully seated in the groove 80, the circlip 78 holds the O-ring 134 in a slightly compressed state.

One function of the O-ring 134 is that it compresses to allow the cap 76 to move axially away from slot 80. This cap movement opens up the slot 80 so that the circlip 78 can be placed into the slot, after which the cap 76 moves back up keeping the circlip 78 from popping out during overload while at the same time limiting vibration between the top cap and housing shoulders.

FIG. 7 shows a portion of another embodiment of a strut assembly 200 that makes use of a bushing 212 having an integrally formed O-ring 234. However, in this embodiment the bushing 212 is held in place beneath a cap 216, which is in turn held to a housing 214 by a roll formed edge feature 214a of the housing 214. The roll formed edge feature 214a is formed through a manufacturing operation during assembly of the strut assembly 200. The roll formed edge feature 214a captures the cap 216 in place on the housing 214, with the bushing 212 held in place in a slightly compressed condition. While a roll form of the housing edge is shown, it is understood by one skilled in the art that any other mechanical deformation of the edge of the housing is considered to be an interchangeable part of the disclosure.

The O-ring 134 (or 234) performs the important operation of preventing vibration between the cap 76 (or 216) and the housing 74 (or 214), as well as helping to sealing an interior area of the housing 74 (or 214). O-ring 134 functions as a vibration isolator. It also serves to accommodate material springback of the cap during the manufacturing operation.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A suspension mount for coupling a first component and a second component of a vehicle, the suspension mount comprising:

a housing including a bore and a first shoulder, the housing adapted to be coupled to the first component of the vehicle;
an elastomeric bushing including a bore adapted to receive the second component of the vehicle, the elastomeric bushing including a first portion, a spaced apart ring portion, and a web portion interconnecting the ring portion and the first portion, wherein the ring portion, the web portion and the first portion are integrally formed with one another;
a cap including a peripheral portion having a second shoulder, the second shoulder including an outer cylindrical surface surrounded by an annular land, wherein the elastomeric bushing is positioned within the housing with the ring portion being engaged with the first shoulder and the second shoulder, the first shoulder cooperating with the second shoulder to trap the ring portion between the housing and the cap and provide a seal and vibration isolator therebetween; and
a fastener fixing the cap to the housing, wherein the fastener includes a cir-clip.

2. A suspension mount for coupling a first component and a second component of a vehicle, the suspension mount comprising:
a housing including a bore and a first shoulder, the housing adapted to be coupled to the first component of the vehicle;
an elastomeric bushing including a bore adapted to receive the second component of the vehicle, the elastomeric bushing including a first portion, a spaced apart ring portion, and a web portion interconnecting the ring portion and the first portion, wherein the ring portion, the web portion and the first portion are integrally formed with one another;
a cap including a peripheral portion having a second shoulder, the second shoulder including an outer cylindrical surface surrounded by an annular land, wherein the elastomeric bushing is positioned within the housing with the ring portion being engaged with the first shoulder and the second shoulder, the first shoulder cooperating with the second shoulder to trap the ring portion between the housing and the cap and provide a seal and vibration isolator therebetween; and
a fastener fixing the cap to the housing, wherein the fastener includes a roll-formed lip integrally formed with the housing, the roll-formed lip engaging an outer surface of the cap and biasing the cap into engagement with the bushing.

3. The suspension mount of claim 1, wherein the bushing includes a metallic inner tube and the second component includes a shock absorber having a piston rod, the piston rod extending through the inner tube and being fixed thereto.

4. The suspension mount of claim 3, wherein the bushing includes an inner body molded to an outer surface of the inner tube and an elastomeric outer body molded to an outer surface of the inner body, the ring portion, first portion and web portion comprising integrally formed portions of the outer elastomeric body.

5. The suspension mount of claim 4, wherein the inner body includes a plastic material.

6. The suspension mount of claim 1, wherein the first shoulder of the housing includes another annular land surrounded by an inner cylindrical surface.

7. The suspension mount of claim 6, wherein the cap includes a through bore in receipt of the second component.

8. A suspension mount for coupling a first component and a second component of a vehicle, the suspension mount comprising:
a housing including a bore and a first shoulder, the housing adapted to be coupled to the first component of the vehicle;
an elastomeric bushing including a bore adapted to receive the second component of the vehicle, the elastomeric bushing including a first portion, a spaced apart ring portion, and a web portion interconnecting the ring portion and the first portion, wherein the ring portion, the web portion and the first portion are integrally formed with one another;
a cap including a peripheral portion having a second shoulder, the second shoulder including an outer cylindrical surface surrounded by an annular land, wherein the elastomeric bushing is positioned within the housing with the ring portion being engaged with the first shoulder and the second shoulder, the first shoulder cooperating with the second shoulder to trap the ring portion between the housing and the cap and provide a seal and vibration isolator therebetween; and
a fastener fixing the cap to the housing, wherein the cap includes a first groove and the housing includes a second groove, the fastener being positioned within the first groove and the second groove, wherein the fastener restricts removal of the cap from the bore of the housing once positioned within the first and second grooves.

9. A suspension mount for coupling a first component and a second component of a vehicle, the suspension mount comprising:
a housing including a bore and a first shoulder, the housing adapted to be coupled to the first component of the vehicle;
an elastomeric bushing including a bore adapted to receive the second component of the vehicle, the elastomeric bushing including a first portion, a spaced apart ring portion, and a web portion interconnecting the ring portion and the first portion, wherein the ring portion, the web portion and the first portion are integrally formed with one another; and
a cap including a peripheral portion having a second shoulder, wherein the elastomeric bushing is positioned within the housing with the ring portion being engaged with the first shoulder, the first shoulder cooperating with the second shoulder to trap the ring portion between the housing and the cap and provide a seal and vibration isolator therebetween, wherein the first portion of the elastomeric bushing includes a conically shaped outer surface and the cap includes a complimentarily shaped surface in engagement therewith.

10. A suspension mount for coupling a first component and a second component of a vehicle, the suspension mount comprising:
an inner tube including a through bore for receiving the second component;
an inner body engaging and surrounding an outer surface of the inner tube;
an outer body engaging and surrounding an outer surface of the inner body, the outer body being elastomeric and including a first portion, a spaced apart ring portion and a web portion interconnecting the ring portion and the first portion, wherein the ring portion, the web portion and the first portion are integrally formed with one another;

a housing adapted to be coupled to the first component and including a bore and a first shoulder, the housing bore being in receipt of the outer body, the first shoulder engaging the ring portion;

a cap including a peripheral portion having a second shoulder, the second shoulder including a convex curved surface surrounded by an annular land, the first shoulder cooperating with the second shoulder to trap the ring portion between the housing and the cap and provide a seal therebetween; and a fastener fixing the cap to the housing, wherein the fastener includes a cir-clip.

11. The suspension mount of claim 10, wherein the outer body, the cap and the housing include aligned apertures in receipt of the second component.

12. A suspension mount for coupling a first component and a second component of a vehicle, the suspension mount comprising:

an inner tube including a through bore for receiving the second component;

an inner body engaging and surrounding an outer surface of the inner tube;

an outer body engaging and surrounding an outer surface of the inner body, the outer body being elastomeric and including a first portion, a spaced apart ring portion and a web portion interconnecting the ring portion and the first portion, wherein the ring portion, the web portion and the first portion are integrally formed with one another;

a housing adapted to be coupled to the first component and including a bore and a first shoulder, the housing bore being in receipt of the outer body, the first shoulder engaging the ring portion;

a cap including a peripheral portion having a second shoulder, the second shoulder including a convex curved surface surrounded by an annular land, the first shoulder cooperating with the second shoulder to trap the ring portion between the housing and the cap and provide a seal therebetween; and a fastener fixing the cap to the housing, wherein the fastener includes a roll-formed lip integrally formed with the housing, the roll-formed lip engaging an outer surface of the cap and biasing the cap into engagement with the bushing.

13. A suspension mount for coupling a first component and a second component of a vehicle, the suspension mount comprising:

an inner tube including a through bore for receiving the second component;

an inner body engaging and surrounding an outer surface of the inner tube;

an outer body engaging and surrounding an outer surface of the inner body, the outer body being elastomeric and including a first portion, a spaced apart ring portion and a web portion interconnecting the ring portion and the first portion, wherein the ring portion, the web portion and the first portion are integrally formed with one another;

a housing adapted to be coupled to the first component and including a bore and a first shoulder, the housing bore being in receipt of the outer body, the first shoulder engaging the ring portion;

a cap including a peripheral portion having a second shoulder, the second shoulder including a convex curved surface surrounded by an annular land, the first shoulder cooperating with the second shoulder to trap the ring portion between the housing and the cap and provide a seal therebetween; and a fastener fixing the cap to the housing, wherein the cap includes a first groove and the housing includes a second groove, the fastener being positioned within the first groove and the second groove, wherein the fastener restricts removal of the cap from the bore of the housing once positioned within the first and second grooves.

14. A suspension mount for coupling a first component and a second component of a vehicle, the suspension mount comprising:

an inner tube including a through bore for receiving the second component;

an inner body engaging and surrounding an outer surface of the inner tube;

an outer body engaging and surrounding an outer surface of the inner body, the outer body being elastomeric and including a first portion, a spaced apart ring portion and a web portion interconnecting the ring portion and the first portion, wherein the ring portion, the web portion and the first portion are integrally formed with one another;

a housing adapted to be coupled to the first component and including a bore and a first shoulder, the housing bore being in receipt of the outer body, the first shoulder engaging the ring portion; and a cap including a peripheral portion having a second shoulder, the second shoulder including a convex curved surface surrounded by an annular land, the first shoulder cooperating with the second shoulder to trap the ring portion between the housing and the cap and provide a seal therebetween, wherein the first portion of the outer body includes a conically shaped outer surface and the cap includes a complimentarily shaped surface in engagement therewith.

* * * * *